US008189968B2

(12) United States Patent
Chen et al.

(10) Patent No.: US 8,189,968 B2
(45) Date of Patent: May 29, 2012

(54) MULTIMODE INTERFERENCE COUPLER FOR USE WITH SLOT PHOTONIC CRYSTAL WAVEGUIDES

(75) Inventors: Xiaonan Chen, Austin, TX (US); Ray T. Chen, Austin, TX (US)

(73) Assignee: Board of Regents, The University of Texas, Austin, TX (US)

( * ) Notice: Subject to any disclaimer, the term of this patent is extended or adjusted under 35 U.S.C. 154(b) by 364 days.

(21) Appl. No.: 12/550,186

(22) Filed: Aug. 28, 2009

(65) Prior Publication Data
US 2010/0226608 A1    Sep. 9, 2010

Related U.S. Application Data

(60) Provisional application No. 61/092,672, filed on Aug. 28, 2008.

(51) Int. Cl.
G02B 6/26 (2006.01)
H01L 21/00 (2006.01)
G03F 1/00 (2006.01)

(52) U.S. Cl. ............ 385/15; 385/12; 385/16; 385/28; 385/31; 385/50; 385/129; 385/130; 385/131; 385/132; 438/29; 438/31; 430/321

(58) Field of Classification Search .............. 385/12, 385/15–16, 28, 31, 50, 129–132; 438/29, 438/31; 430/321
See application file for complete search history.

(56) References Cited

U.S. PATENT DOCUMENTS

| 5,526,449 A | 6/1996 | Meade et al. |
| 5,889,906 A | 3/1999 | Chen |
| 6,381,389 B1 | 4/2002 | Kosaka |
| 6,687,447 B2 | 2/2004 | Flory et al. |
| 6,782,169 B2 | 8/2004 | Shi et al. |
| 6,795,621 B2 | 9/2004 | Tokushima |
| 7,016,586 B2 * | 3/2006 | Zoorob et al. ............ 385/129 |
| 7,027,701 B2 * | 4/2006 | Parker et al. ............ 385/129 |

(Continued)

FOREIGN PATENT DOCUMENTS

WO    02/088799 A1    11/2002

OTHER PUBLICATIONS

International Search Report and Written Opinion for PCT/US2009/055446 dated Mar. 25, 2010.

(Continued)

*Primary Examiner* — Brian M. Healy
*Assistant Examiner* — Guy Anderson
(74) *Attorney, Agent, or Firm* — Daniel J. Chalker; Edwin S. Flores; Chalker Flores, LLP

(57) ABSTRACT

The present invention provides an optical apparatus having a multimode interference coupler configured to optically couple a strip waveguide to a slot photonic crystal waveguide. The multimode interference coupler has a coupling efficiency to the slot photonic crystal waveguide greater than or equal to 90%, a width that is approximately equal to a defect width of the slot photonic crystal waveguide, a length that is equal to or less than 1.5 μm, and interfaces with the slot photonic crystal waveguide at an edge of a period that gives a termination parameter of approximately zero. The optical apparatus may also include an insulation gap disposed between the multimode interference coupler and the slot photonic crystal waveguide, wherein the length of the multimode interference coupler is reduced by approximately one half of a width of the insulation gap.

26 Claims, 10 Drawing Sheets

U.S. PATENT DOCUMENTS

| | | | |
|---|---|---|---|
| 7,072,547 | B2 | 7/2006 | Assefa et al. |
| 7,082,235 | B2 | 7/2006 | Gunn, III |
| 7,116,878 | B2* | 10/2006 | Zoorob et al. ............. 385/129 |
| 7,162,132 | B2* | 1/2007 | Parker et al. ............. 385/129 |
| 7,269,305 | B2* | 9/2007 | Tsuda et al. ............. 385/4 |
| 7,565,046 | B2* | 7/2009 | Feng et al. ............. 385/28 |
| 7,613,367 | B2* | 11/2009 | Levy et al. ............. 385/13 |
| 8,023,822 | B2* | 9/2011 | Costa et al. ............. 398/68 |
| 2002/0159703 | A1 | 10/2002 | McGreer |
| 2003/0133661 | A1 | 7/2003 | Adibi et al. |
| 2004/0067035 | A1* | 4/2004 | Parker et al. ............. 385/129 |
| 2004/0146257 | A1* | 7/2004 | Parker et al. ............. 385/123 |
| 2004/0213536 | A1* | 10/2004 | Zoorob et al. ............. 385/131 |
| 2005/0135733 | A1* | 6/2005 | Reid et al. ............. 385/15 |
| 2006/0140535 | A1* | 6/2006 | Tsuda et al. ............. 385/16 |
| 2006/0153500 | A1 | 7/2006 | Sendra et al. |
| 2006/0198567 | A1* | 9/2006 | Levy et al. ............. 385/12 |
| 2009/0041462 | A1* | 2/2009 | Costa et al. ............. 398/79 |

OTHER PUBLICATIONS

V. R. Almeida, Q. Xu, C. A. Barrios, and M. Lipson, Opt. Lett. 29, 1209 (2004).

Bortnik, B., et al., "Electrooptic Polymer Ring Resonator Modulation up to 165 GHz," IEEE Journal of Selected Topics in Quantum Electronics 13:104-110 (2007).

Chen, R. T., et al., "Fully Embedded Board-Level Guided-Wave Optoelectronic Interconnects," Proceedings of the IEEE 88:780-793 (2000).

X. Chen, L. Gu, W. Jiang, R. Chen, "Active transmission control based on photonic-crystal MOS capacitor," Proc. Of SPIE, vol. 6480, 64800W (2007).

Choi, C., et al., "Performance Analysis of 10-um-Thick VCSEL Array in Fully Embedded Board Level Guided-Wave Optoelectronic Interconnects," Journal of Lightwave Technology 21:1531-1535 (2003).

Choi, C., et al., "Flexible Optical Waveguide Film Fabrications and Optoelectronic Devices Integration for Fully Embedded Board-Level Optical Interconnects," Journal of Lightwave Technology 22:2168-2176 (2004).

Choi, J. H., et al., "Effects of Thermal-Via Structures on Thin-Film VCSELs for Fully Embedded Board-Level Optical Interconnection System," IEEE Journal of Selected Topics in Quantum Electronics 12:1060-1065 (2006).

Chow, E., et al., "Three-dimensional control of light in a two-dimensional photonic crystal slab," Nature 407: 983-986.

Fan, S., et al., "High Extraction Efficiency of Spontaneous Emission from Slabs of Photonic Crystals," Physical Review Letters 78:3294-3297 (1997).

N. N. Feng, R. Sun, L. C. Kimerling, et al., "Lossless strip-to-slot waveguide transformer," Optics Lett. 32 (10), pp. 1250-1252 (May 15, 2007).

L. Gu, Y. Jiang, W. Jiang, X. Chen, and R. T. Chen, Proc. SPIE 6128, 261 (2006).

Gu, L., et al., "High speed silicon photonic crystal waveguide modulator for low voltage operation," Applied Physics Letters 90:071105 (2007).

Gu, L., et al., "Thermooptically Tuned Photonic Crystal Waveguide Silicon-on-Insulator Mach-Zehnder Interferometers," IEEE Photonics Technology Letters 19:342-344 (2007).

Jiang, Y., et al., "80-micron interaction length silicon photonic crystal waveguide modulator," Applied Physics Letters 87:221105 (2005).

Johnson, S. G., et al., "Guided modes in photonic crystal slabs," Physical Review B 60:5751-5758 (1999).

Johnson, S. G., et al., "Linear waveguides in photonic-crystal slabs," Physical Review B 62:8212-8222 (2000).

Lau, W. T., Fan, S., "Creating large bandwidth line defects by embedding dielectric waveguides into photonic crystal slabs," Applied Physics Letters 81:3915-3917 (2002).

Li, Z-Y, et al., "Light coupling with multimode photonic crystal waveguides," Applied Physics Letters 84:4699-4701 (2004).

Liao, L., et al., "High speed silicon Mach-Zehnder modulator," Optics Express 13:3129-3135 (2005).

Liu, A., et al., "A high-speed silicon optical modulator based on a metal-oxide-semiconductor capacitor," Nature 427:615-618 (2004).

Notomi, M., et al., "Extremely Large Group-Velocity Dispersion of Line-Defect Waveguides in Photonic Crystal Slabs," Physical Review Letters 87:253902 (2001).

Notomi, M., et al., "Structural Tuning of Guiding Modes of Line-Defect Waveguides of Silicon-on-Insulator Photonic Crystal Slabs," IEEE Journal of Quantum Electronics 38:736-742 (2002).

Rouusey, M., et al., "Electro-optic effect exaltation on lithium niobate photonic crystals due to slow photons," Applied Physics Letters 89:241110 (2006).

Soldano, L. B., Pennings, E. C. M., "Optical Multi-Mode Interference Devices Based on Self-Imaging: Principles and Applications," Journal of Lightwave Technology 13:615-627 (1995).

Soljacic, M., et al., "Photonic-crystal slow-light enhancement of nonlinear phase sensitivity," J. Opt. Soc. Am. B 19: 2052-2059 (2002).

Soref, R. A., Bennett, B. R., "Electrooptical Effects in Silicon," IEEE Journal of Quantum Electronics QE-23:123-129 (1987).

Vlasov, Y. A., et al., "Mode mixing in asymmetric double-trench photonic crystal waveguides," Journal of Applied Physics 95:4538-4544 (2004).

Vlasov, Y. A., et al., "Active control of slow light on a chip with photonic crystal waveguides," Nature 438:65-69 (2005).

Y. A. Vlasov and S. J. McNab, Opt. Lett. 31, 50 (2005).

Wang, Y., et al., "Side-wall roughness in SOI rib waveguides fabricated by inductively coupled plasma reactive ion etching," Appl. Phys. B 79:879-881 (2004).

Q. Xu, V. R. Almeida, R. R. Panepucci, and M. Lipson, Opt. Lett. 29, 1626 (2004).

* cited by examiner

MULTIMODE INTERFERENCE COUPLER FOR USE WITH SLOT PHOTONIC CRYSTAL WAVEGUIDES

CROSS-REFERENCE TO RELATED APPLICATIONS

This application claims benefit of U.S. provisional patent application Ser. No. 61/092,672 filed on Aug. 28, 2008 which is incorporated herein by reference in its entirety.

STATEMENT OF FEDERALLY FUNDED RESEARCH

This invention was made with U.S. Government support under contract number FA9550-05-C-0171 awarded by the Air Force Office of Scientific Research. The government has certain rights in this invention.

TECHNICAL FIELD OF THE INVENTION

The present invention relates in general to the field of optical waveguides, and more particularly to multimode interference couplers.

BACKGROUND OF THE INVENTION

Without limiting the scope of the invention, its background is described in connection with multimode interference couplers and photonic crystal waveguides. Introducing line defects into a photonic crystal lattice permits an electromagnetic wave having a frequency within the bandgap of the structure to be guided through the photonic crystal. The line defects resemble waveguides, and may be formed by either adding or removing dielectric material to a certain row or column along one of the directions of the photonic crystal lattice. Thus, photonic crystal waveguides can be used as an optical "wire" to guide an optical signal between different points, or devices, within an optical integrated circuit.

Photonic crystal waveguides (PCW) with low group velocity have been demonstrated recently to replace conventional optical switches and modulators [1-4], where the size of the active region is considerably reduced via slow light effect [5,6]. They typically consist of a periodic array of air holes on a dielectric substrate whose optical properties are modified by an external physical signal. One of the most efficient tuning methods may be based on the application of electro-optical material. It is well known that the unique properties of photonic crystals can be exploited to enhance the nonlinear effect drastically and thus a small attainable change in the refractive index can induce applicable optical response [7].

For example, U.S. Pat. No. 6,782,169 discloses a coupler having a dielectric mirror or Gaussian mirror to couple optical signals from a planar waveguide to a PCW. Although the mirrored coupler provides a coupling efficiency of greater than 80%, the coupler does not permit the optical path of the planer waveguide to be longitudinally aligned with the optical path of the PCW. In addition, the actual coupling efficiency of the coupler is dependant on the manufacturing quality of the mirror, which necessarily increases the cost and complexity of the coupler.

As disclosed in U.S. Pat. No. 5,889,906, multimode interference couplers of varying shapes have been used. The width of the wide end of these couplers is about 15 µm and the length of these couplers range between 200 µm and 600 µm. Another example of tapered couplers is disclosed in United States Patent Application Publication 2002/0159703. The width of the wide end of these couplers range between 10 µm and 50 µm, and the length of these couplers range between 150 µm to 500+ µm. These couplers require a taper length of more than several hundred of microns to reduce the propagation loss due to the requirement of adiabatic tapering.

The inventors previously disclosed that a simple MMI coupling structure between a channel waveguide and a PCW with a center trench can achieve a coupling efficiency of 70%. See X. Chen, L. GU, W. Jiang, R. Chen, "Active transmission control based on photonic-crystal MOS capacitor," *Proc. of SPIE*, vol. 6480, 64800W (2007), which is hereby incorporated by reference in its entirety. The MMI section interfaces with the slot PCW at the edge of the period that gives a termination parameter of $\tau=0.5$. The width of the coupler is equal to the defect width of the slot PCW and the length of the coupler is approximately 1.25 times the width of the coupler.

As a result, there is a need for a MMI coupling structure that is small, does not require complicated structures or fabrication, yet provides a coupling efficiency that exceeds 90%.

SUMMARY OF THE INVENTION

The present invention provides a novel multimode interference (MMI) coupler or structure integrated with a slot photonic crystal waveguide (PCW) for guiding light with low group velocity in a 100-nm-wide low-index region that provides unexpected results when: (a) the width ($L_M$) of the MMI coupler is adjusted to set the phase difference close to $\pi$; and (b) the termination parameter ($\tau$) is set to 0. The MMI coupler provides a 20 dB efficiency enhancement over a 35 nm optical bandwidth centered at the communication wavelength of 1550 nm compared with direct coupling configuration and has a coupling efficiency that exceeds 90%. In addition, the MMI coupler implements a more compact structure (e.g., 1.25 µm) compared to tapered MMI couplers (e.g., 10-500+ µm). As a result, the MMI coupler is a more efficient and practical device (cost, design, fabrication, reliability and power consumption) than prior art devices. These advantages are crucial for fully embedded board level interconnect where heat dissipation due to the fully embedded structure is a paramount concern. Moreover, the present invention can be used in sensors (e.g., bio-sensors, chemical sensors, structural sensors, etc.), telecommunications, fiber optics and data communications (e.g., routers, fully embedded board level interconnects, etc.) to name a few.

More specifically, one embodiment of the present invention provides an optical apparatus having a multimode interference coupler configured to optically couple a strip waveguide to a slot photonic crystal waveguide. The multimode interference coupler has a coupling efficiency to the slot photonic crystal waveguide greater than or equal to 90%, a width that is approximately equal to a defect width of the slot photonic crystal waveguide, a length that is equal to or less than 1.5 µm, and interfaces with the slot photonic crystal waveguide at an edge of a period that gives a termination parameter of approximately zero. The length of the multimode interference coupler will often be equal to or less than 1.26 µm.

Another embodiment of the present invention provides an optical apparatus having a multimode interference coupler configured to optically couple a strip waveguide to a slot photonic crystal waveguide. The multimode interference coupler has a coupling efficiency to the slot photonic crystal waveguide greater than or equal to 90%, a width that is approximately equal to $1.6\sqrt{3}\alpha$ where $\alpha$ is a lattice constant of the slot photonic crystal waveguide, a length that is approximately equal to $\pi/(\beta_0-\beta_2)$ where $\beta_0$ is a fundamental mode propagation constant in the multimode interference coupler and $\beta_2$ is a second order propagation constant in the multimode interference coupler, and interfaces with the slot photonic crystal waveguide at an edge of a period that gives a termination parameter of approximately zero.

Yet another embodiment of the present invention provides an optical apparatus having a strip waveguide, a slot photonic crystal waveguide and a multimode interference coupler disposed between the strip waveguide and the slot photonic crystal waveguide The multimode interference coupler has a coupling efficiency to the slot photonic crystal waveguide greater than or equal to 90%, a width that is approximately equal to a defect width of the slot photonic crystal waveguide, a length that is equal to or less than 1.5 μm, and interfaces with the slot photonic crystal waveguide at an edge of a period that gives a termination parameter of approximately zero. The length of the multimode interference coupler will often be equal to or less than 1.26 μm.

The present invention also provides a method for improving performance of an optical communication system by designing a multimode interference coupler having a width that is approximately equal to $1.6\sqrt{3}\alpha$ where $\alpha$ is a lattice constant of a slot photonic crystal waveguide, a length that is approximately equal to $\pi/(\beta_0-\beta_2)$ where $\beta_0$ is a fundamental mode propagation constant in the multimode interference coupler and $\beta_2$ is a second order propagation constant in the multimode interference coupler. The multimode interference coupler is then fabricated between a strip waveguide and the slot photonic crystal waveguide such that the multimode interference coupler interfaces with the slot photonic crystal waveguide at an edge of a period that gives a termination parameter of approximately zero.

In addition, the foregoing optical devices may include an insulation gap disposed between the multimode interference coupler and the slot photonic crystal waveguide, wherein the length of the multimode interference coupler is reduced by approximately one half of a width of the insulation gap. The resulting multimode interference coupler provides an efficiency enhancement of approximately thirty times that of a slotted silicon rib waveguide.

Moreover, the present invention provides a method for manufacturing an optical apparatus by providing a silicon-on-insulator wafer with a buried oxide layer and a top silicon layer and forming a hexagonal lattice photonic crystal slab layer. The hexagonal lattice photonic crystal slab layer is then patterned to form a plurality of crystal holes and a center trench of a slot photonic crystal waveguide, and a multimode interference coupler at one or both ends of the center trench using electron-beam lithography followed by reactive ion etching and piranha cleaning The multimode interference coupler has a coupling efficiency to the slot photonic crystal waveguide greater than or equal to 90%, a width that is approximately equal to a defect width of the slot photonic crystal waveguide, a length that is equal to or less than 1.5 μm, and interfaces with the slot photonic crystal waveguide at an edge of a period that gives a termination parameter of approximately zero. The crystal holes and the center trench are filled with a spin-on-glass material and the silicon-on-insulator wafer is postbaked to achieve partial decarbonization. At least the multimode interference coupler and the slot photonic crystal waveguide are then coated with an acrylic-based polymer layer that is optically transparent for a specified wavelength.

Note that the step of patterning the hexagonal lattice photonic crystal slab layer can further form an insulation gap disposed between the multimode interference coupler and the slot photonic crystal waveguide, wherein the length of the multimode interference coupler is reduced by approximately one half of a width of the insulation gap.

Furthermore, the present invention provides a method for manufacturing an optical apparatus by providing a silicon-on-insulator wafer with a buried oxide layer and a top silicon layer and forming a hexagonal lattice photonic crystal slab layer. The hexagonal lattice photonic crystal slab layer is then patterned to form a plurality of crystal holes and a center trench of a slot photonic crystal waveguide, wherein at least a portion of the center trench is configured to receive one or more samples, and a multimode interference coupler at one or both ends of the center trench using electron-beam lithography followed by reactive ion etching and piranha cleaning The multimode interference coupler has a coupling efficiency to the slot photonic crystal waveguide greater than or equal to 90%, a width that is approximately equal to a defect width of the slot photonic crystal waveguide, a length that is equal to or less than 1.5 μm, and interfaces with the slot photonic crystal waveguide at an edge of a period that gives a termination parameter of approximately zero. The crystal holes are filled with a spin-on-glass material and the silicon-on-insulator wafer is postbaked to achieve partial decarbonization. At least the multimode interference coupler and the slot photonic crystal waveguide, except for the portion of the center trench that is configured to receive the one or more samples, are then coated with an acrylic-based polymer layer that is optically transparent for a specified wavelength.

The present invention is described in detail below with reference to the accompanying drawings.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1:
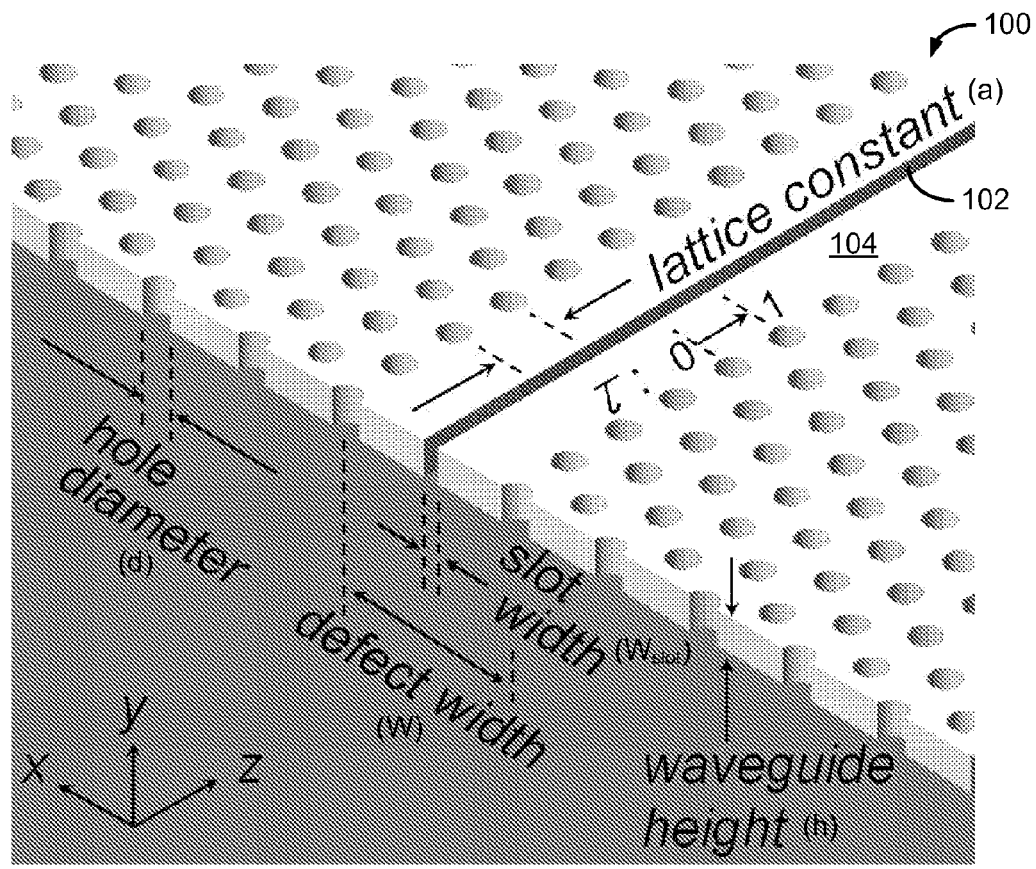
FIG. 1 is a diagram of a slot PCW in accordance with one embodiment of the present invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The present invention provides a novel multimode interference (MMI) coupler or structure integrated with a slot photonic crystal waveguide (PCW) for guiding light with low group velocity in a 100-nm-wide low-index region that provides unexpected results when: (a) the width ($L_M$) of the MMI coupler is adjusted to set the phase difference close to π; and (b) the termination parameter (τ) is set to 0. The MMI coupler provides a 20 dB efficiency enhancement over a 35 nm optical bandwidth centered at the communication wavelength of 1550 nm compared with direct coupling configuration and has a coupling efficiency that exceeds 90%. In addition, the MMI coupler implements a more compact structure (e.g., 1.25 μm) compared to tapered MMI couplers (e.g., 10-500+ μm). As a result, the MMI coupler is a more efficient and practical device (cost, design, fabrication, reliability and power consumption) than prior art devices. These advantages are crucial for fully embedded board level interconnect where heat dissipation due to the fully embedded structure is a paramount concern. Moreover, the present invention can be used in sensors (e.g., bio-sensors, chemical sensors, structural sensors, etc.), telecommunications, fiber optics and data communications (e.g., routers, fully embedded board level interconnects, etc.) to name a few.

The slot PCW exhibits low group velocity near the band edge and therefore leads to a significant enhancement of nonlinear effect for active devices. The waveguide structure produces high electric field amplitude in a narrow low-index region and provides a feasible approach to apply low-index active materials in highly integrated optical circuits. With proper doping of the left and right silicon regions, a high external field can be generated across the narrow slot with a low voltage. This maximizes the overlap of a high optical mode field and a high external electric field and, together with the low group velocity, provides a promising approach to applying low-index EO materials in highly integrated optical circuits. In addition, the measured transmission spectra are in good agreement with simulated band diagram.

In order to apply the improved electro-optical effects in waveguide devices and to satisfy the low power requirement, a guided mode needs to be excited within a narrow active material region. An integrated optical waveguide called a slot waveguide opens the opportunity for guiding and confining light in a 100-nm-wide slot filled with low-refractive-index electro-optical materials [8, 9]. These nanostructures are embedded in photonic crystals and a slot PCW configuration is designed in order to combine the unusual optical features of photonic crystals and slot waveguides. A compact MMI structure or coupler is integrated and optimized to maximize the coupling efficiency from strip waveguides to the slotted region.

The design of the slot PCW 100 will now be described in reference to FIG. 1. The slot PCW 100 is a line defect structure with a low-index nanometer-size center slot 102 embedded in a photonic crystal slab 104. The slotted photonic crystal slab 104, with high refractive index $n_{Si}$=3.48, is sandwiched between two low-index regions with $n_{SiO2}$=1.46. Theoretical analysis predicts that such photonic crystal structures with high index contrast in the vertical direction support an in-plane photonic band gap that lies below the light line [11, 12]. Defect modes within the gap region can be created by various line defects [13]. The line defect is generated in the photonic crystal slab 104 by replacing a single row of holes with a narrow slot 102 and enlarging the width of the defect region to create a relatively large effective core area of the waveguide 100. The scattering loss due to side-wall roughness can therefore be reduced with larger waveguide width [14]. As a wider defect region may induce multiple bands into the gap region, care must be taken to design the enlarged defect width [15].

The slot PCW 100 is defined by the following variables:
Defect width (W);
Hole diameter (d);
Lattice constant (α);

Slot width ($W_{slot}$);

termination parameter ($\tau$) where $0 \leq \tau \leq 1$; and

Waveguide height (h).

Figure 2:
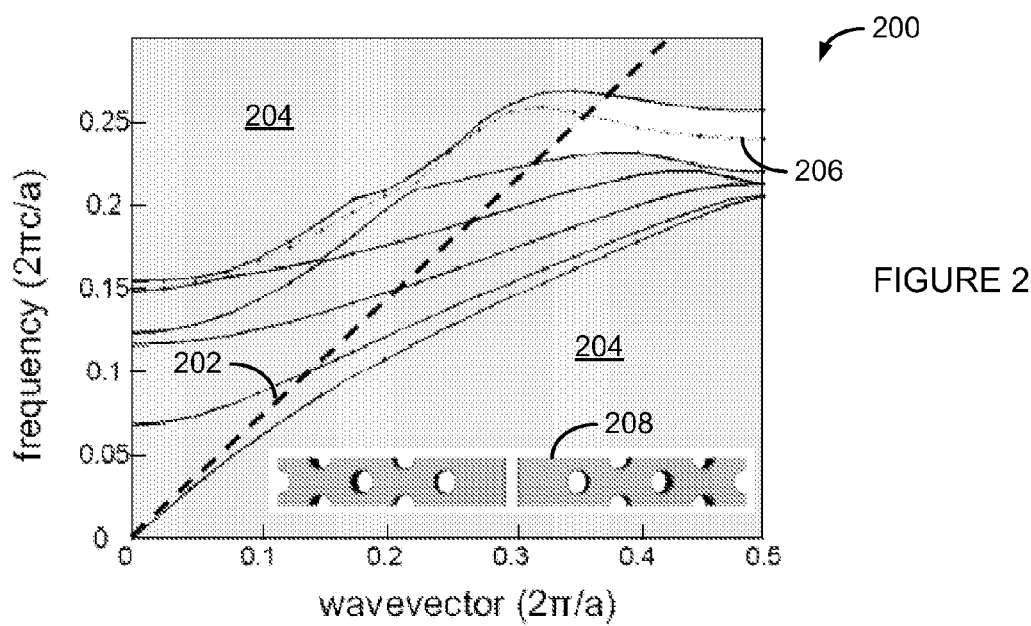
FIG. 2 is a band diagram for a slot PCW shown in FIG. 1.

A three-dimensional (3D) fully vectorial plane-wave expansion (PWE) method is used to calculate the dispersion diagram of the slot PCW 100. In this case, the hole diameter (d) is $0.5\alpha$ and the waveguide height (h) is $0.6\alpha$, where $\alpha$ (e.g., 380 nm) is the lattice constant of the photonic crystals. The band diagram 200 shown in FIG. 2 indicates that the slotted photonic crystals still have a single-mode region when the defect width (W) is enlarged to 1.6 W, where $W=\sqrt{3\alpha}$ is the width of the normal line defect [16]. The thick dashed line 202 is the light line. The gray regions 204 represent the continuum of extended modes. The dotted curve 206 indicates the created defect mode. The inset 208 shows the supercell model defined in PWE simulation.

Figure 3:
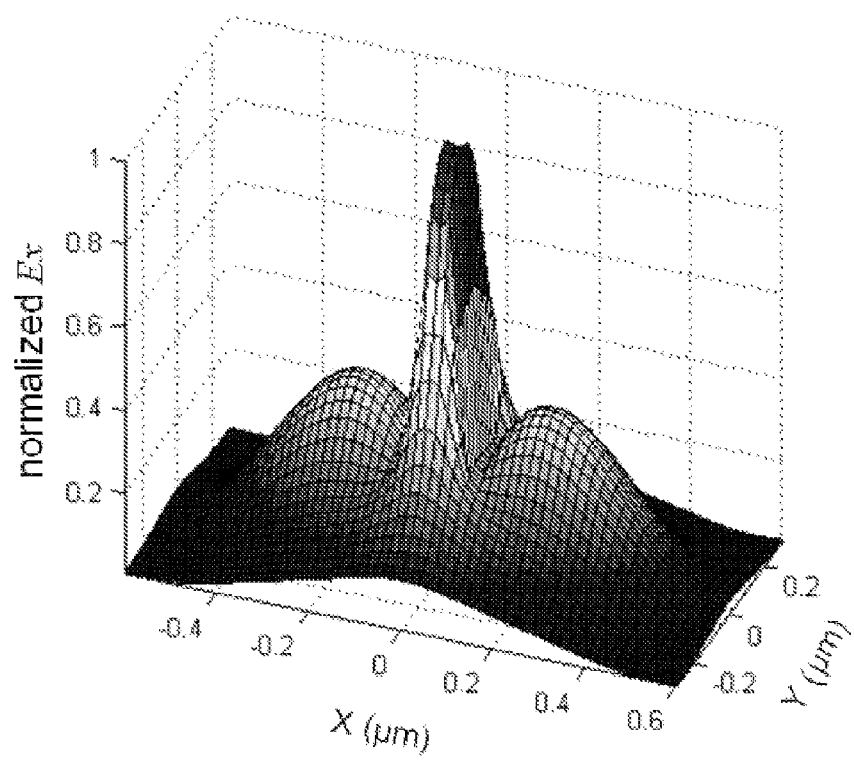
FIG. 3 is a 3D graphical profile of the transverse electric field amplitude of the quasi-TE mode in a slot photonic crystal waveguide in accordance with one embodiment of the present invention.

The guided mode is a quasi-transverse-electric (quasi-TE) mode with slow light effect near the band edge. Based on Maxwell's equations, when the transverse electric field of the quasi-TE mode (Ex) undergoes strong dielectric constant discontinuity of the slot walls, the immediate electric field is much higher at the low-index side [8]. It has been experimentally demonstrated that the field amplitude remains high all across the slot if the slot width is much smaller than the field decay length $1/\gamma s$-$4.0\alpha$, where $\gamma s$ is the field decay coefficient in the slot [9]. Based on the same operation principle, the slot width ($W_{slot}$) of the slot PCW 100 is set to $0.25\alpha$ and a high E-field confinement is obtained in the slot as shown in FIG. 3, which is a 3D profile of the transverse electric field amplitude of the quasi-TE mode in a slot photonic crystal waveguide 100, where $\alpha=380$ nm, d=190 nm, h=228 nm, $W_{slot}=95$ nm, W=1053 nm, $n_{Si}=3.48$ and $n_{SLOT}=n_{SiO2}=1.46$. Simulation is based on 3D finite-difference time-domain (FDTD) method. The structure features of the slot PCW 100 nicely match the requirements for active material-based silicon devices: the guided mode produces high electric field in a low-index region, creating an opportunity for various low-index electro-optical materials; the slow group velocity of the defect mode can drastically enhance the electro-optical effect and thereby open up the possibility of ultra-compact nonlinear devices. Moreover, as the width of the center slot region is less than 100 nm, the novel photonic crystal structure provides a convenient way to generate sufficient external electric field for active materials with low driving voltage.

Figure 4:
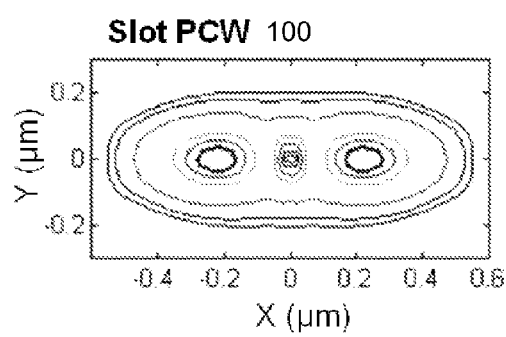
FIG. 4 is a diagram of two dimensional field amplitude contours of a slot PCW in accordance with one embodiment of the present invention.
Figure 5:
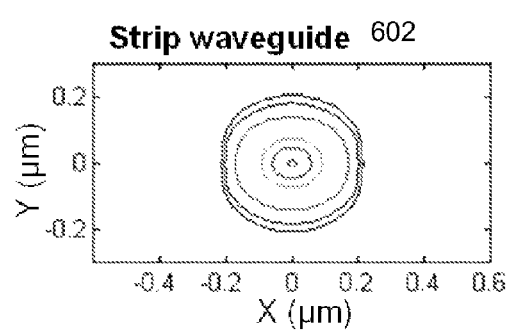
FIG. 5 is a diagram of two dimensional field amplitude contours of a single mode strip waveguide in accordance with one embodiment of the present invention.
Figure 6:
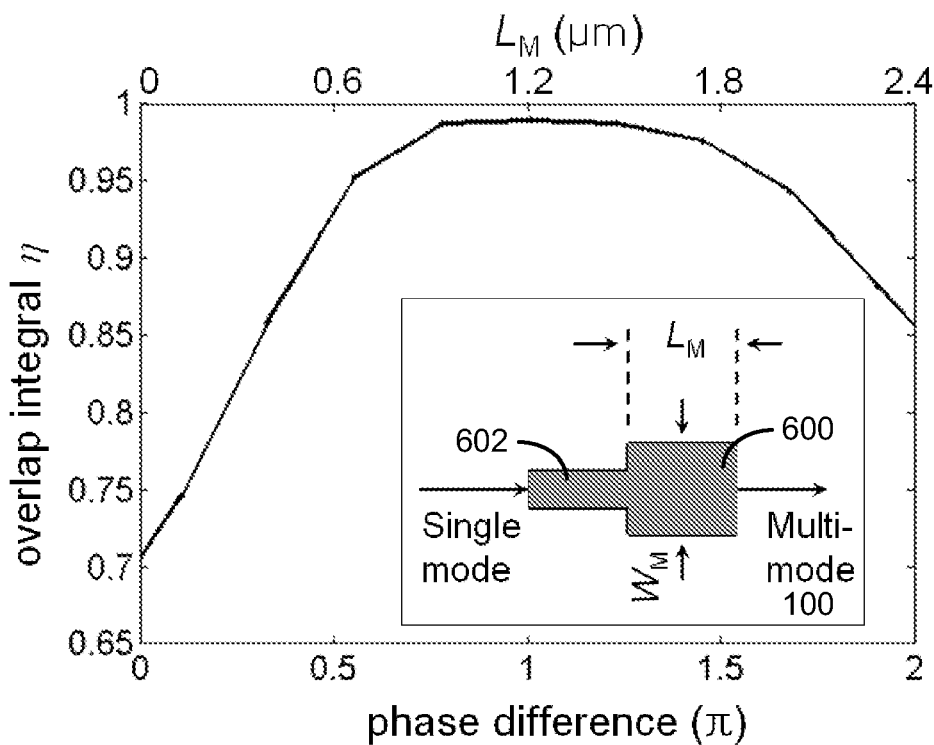
FIG. 6 is a graph showing the optimization of the mode overlap integral between the slot PCW and the multimode section as a function of phase difference and length, and the dimensions of the MMI coupler (inset) in accordance with one embodiment of the present invention.

The design and optimization of a MMI coupler in accordance with the present invention will now be described. FIGS. 4 and 5 show a mode contour comparison of a slot PCW 100 (FIG. 4) and a single-mode silicon strip waveguide 602 (FIG. 5). As can be seen in the FIGURES, a large coupling loss is inevitable for direct coupling due to the mode-size and mode-shape mismatch. A common solution is to introduce a single-mode to multi-mode waveguide taper structure. However, as previously described, the tapering structure requires a minimal taper length of several hundred of microns to reduce the propagation loss due to mode transformation. As shown in FIG. 6, the MMI coupler 600 in accordance with the present invention is a much more compact mode converter.

Multimode power splitter structures are often used to achieve equi-phase, balanced power partition from one single-mode input waveguide [17]. According to the principle of symmetric modal interference in a multimode waveguide [17]: the input signal excites the fundamental and second-order mode with different propagation constants; the total field profile is composed of the fundamental mode plus the second-order mode shifted by the phase difference. The phase difference is given by $$\Delta\sigma = (\beta_0 - \beta_2) L_M,$$

where $L_M$ is the length of the multimode section and $\beta_0$ and $\beta_2$ are the propagation constants of the fundamental and second-order modes in the multimode waveguide, respectively. The length ($L_M$) of the multimode section 600 is adjusted to change the phase difference between 0 and $\pi$ such that the resultant mode profile can best match the slot PCW 100. The multimode section 600 is designed to support two symmetric modes with $W_M=1.6$ W. The single-mode input waveguide is centered with respect to the multimode section and will therefore excite only the even symmetric modes. With different $L_M$ assumed, the coupling efficiency $\eta$ is estimated by the overlap integral between the output mode of the multimode section and the guided mode of the slot PCW 100. FIG. 6 shows the optimization of the mode overlap integral between the slot PCW 100 and the multimode section 602. The integral is calculated as a function of the length $L_M$ of the multimode section 600 and the phase difference of the excited even modes. FIG. 6 shows that a $\pi$ phase difference of the even modes in the multimode waveguide provides the best coupling efficiency from the silicon strip waveguide to the slotted PCW 100, and that coupling efficiencies in excess of 95% can be achieved.

Figure 7:
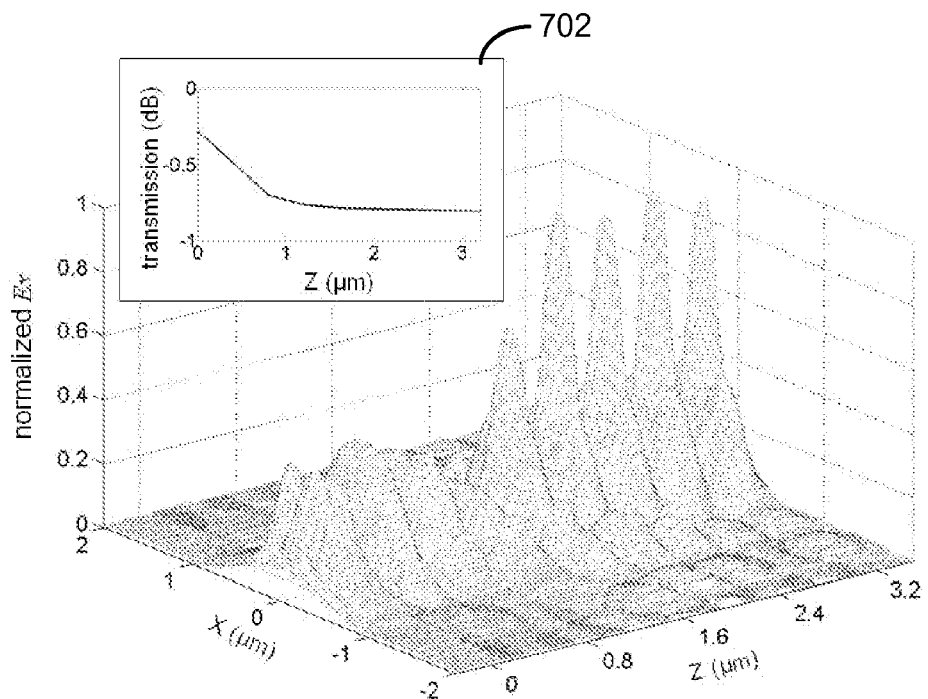
FIG. 7 is a picture of FDTD simulation results and an inset showing the transmission of the guided quasi-TE mode as a function of the propagation distance in accordance with one embodiment of the present invention.
Figure 8:
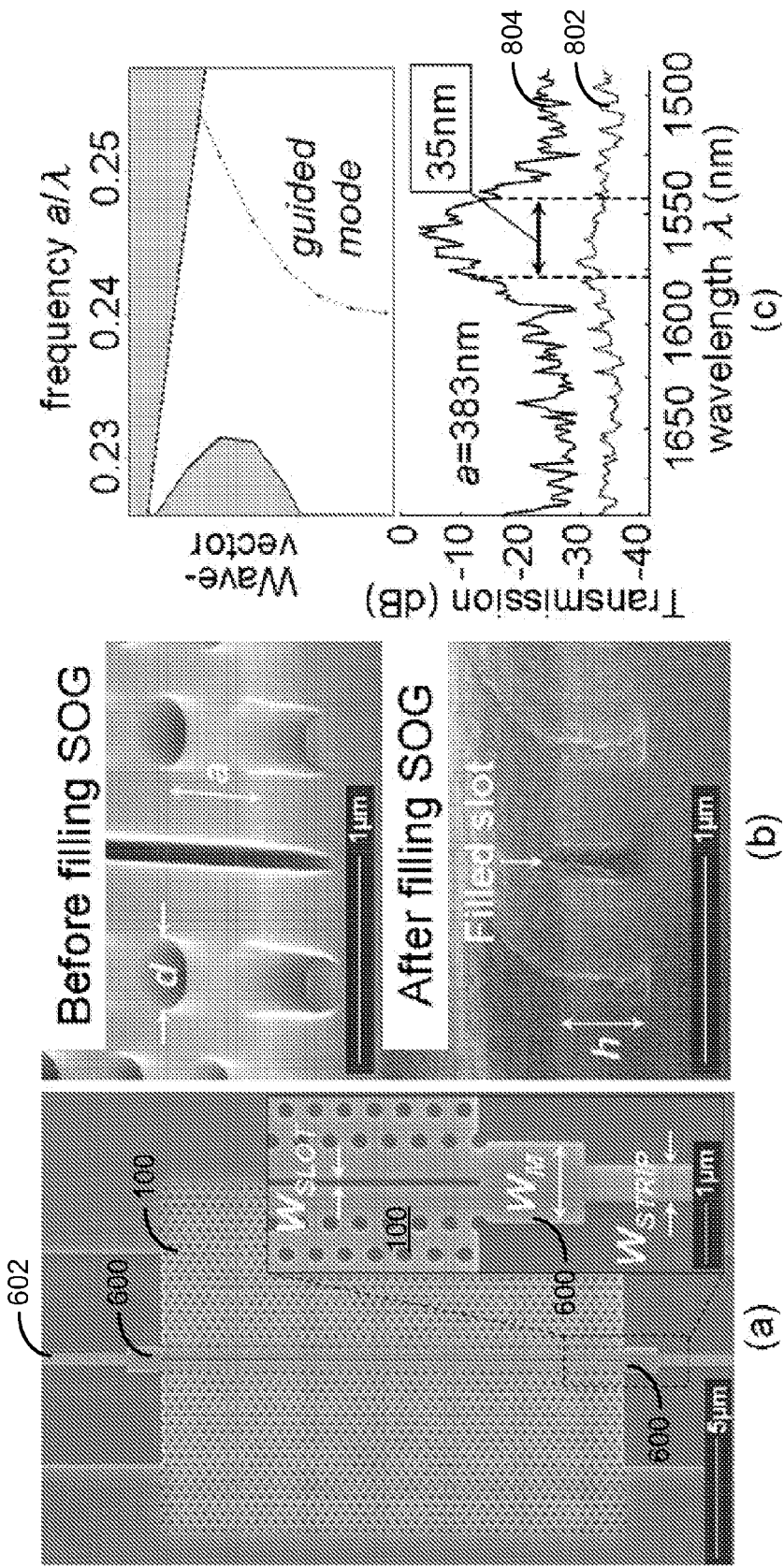
FIG. 8(a) is a scanning electron microscopy picture with a top view of a slot PCW 100 integrated with two MMI couplers 600 with an insert enlarging the coupling region in accordance with one embodiment of the present invention.
FIG. 8(b) is a picture of a cross-sectional view of the slot PCW 100 before (top) and after (bottom) filling SOG in accordance with one embodiment of the present invention.
FIG. 8(c) is an enlarged portion of the dispersion diagram for the guided mode (top graph) and a transmission spectra of a 320 μm slot PCW with (solid) and without (dashed) the MMI coupler (bottom graph) in accordance with one embodiment of the present invention.

The FDTD method is applied to simulate the evolution of transverse electric field and optical transmission along the propagation direction. The results are shown in FIG. 7 where a group of 3D Ex profiles in X-Y plane are imaged at different Z positions. The transfer region begins at Z=0 µm. The inset 702 shows the transmission of the guided quasi-TE mode as a function of propagation distance. The MMI coupler 600 is located between Z=0 µm and Z=1.25 µm. An efficient mode coupling from the conventional silicon strip waveguide 602 to the novel slot PCW 100 is confirmed. An efficient mode conversion from the conventional silicon strip waveguide to the slot PCW is completed within a 3 µm distance. The FDTD simulation confirms the total insertion loss induced by mode conversion is less than 1 dB. The coupling efficiency for a PCW also depends on the termination of the photonic crystal waveguide. [18] The present invention simulated the coupling structure with different PCW terminations and the best outcome is obtained when the MMI section 600 interfaces with the slot PCW 100 at the edge of the period which gives termination parameter $\tau=0$, as also indicated in FIG. 1. FIG. 8(a) is a scanning electron microscopy picture with a top view of a slot PCW 100 integrated with two MMI couplers 600 with an insert enlarging the coupling region in accordance with the present invention.

Figure 9:
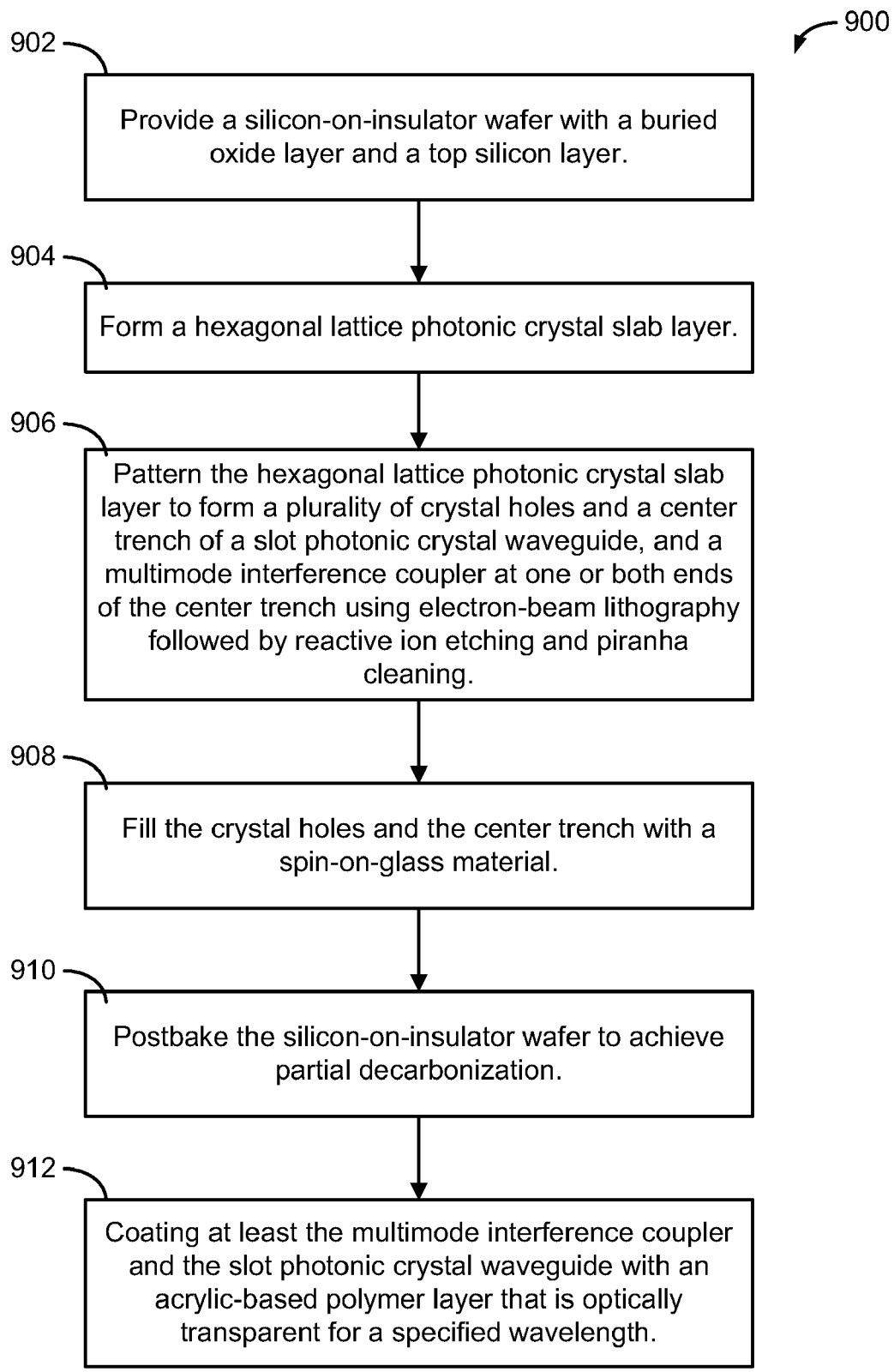
FIG. 9 is a flow chart of a manufacturing process to fabricate an optical apparatus in accordance with one embodiment of the present invention.
Figure 10:
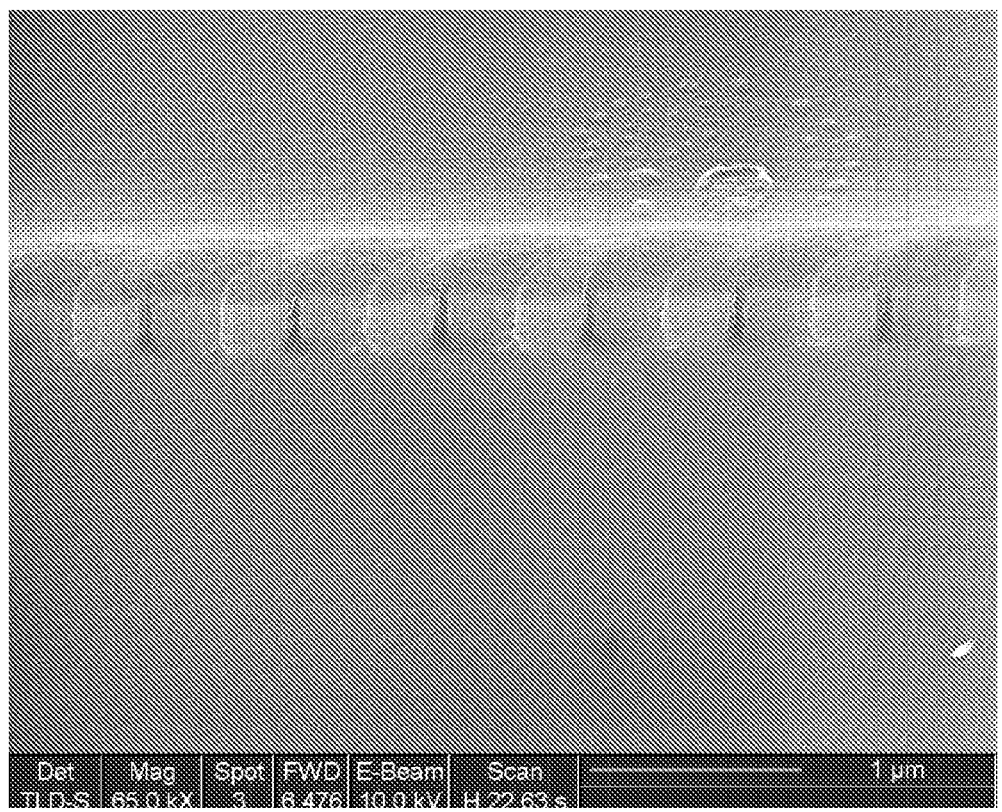
FIG. 10 is a picture of a cross-sectional view of the slot PCW 100 showing that all the void nanostructures in the waveguide slab layer have been filled with SOG in accordance with one embodiment of the present invention.

Now referring to FIG. 9, the manufacturing process 900 and measurement results for the slot PCW 100 with MMI coupler 600 will now be described. A silicon-on-insulator (SOI) wafer with a buried oxide layer (e.g., 1-µm) and a top silicon layer (e.g., 250-nm) is provided in block 902. A hexagonal lattice photonic crystal slab layer 104 is formed in block 904. The hexagonal lattice photonic crystal slab layer 104 is then patterned to form a plurality of crystal holes and a center trench 102 of a slot photonic crystal waveguide 100 (e.g., lattice constant $\alpha=360/380$ nm and the hole diameter $d=0.5\alpha$), and a multimode interference coupler 600 at one or both ends of the center trench 102 using electron-beam lithography followed by reactive ion etching (RIE) and piranha cleaning in block 906. Different lattice constants are employed to measure the optical transmission spectra for both guided mode and leaky modes of the waveguide 100. The multimode interference coupler 600 has a coupling efficiency to the slot photonic crystal waveguide 100 greater than or equal to 90%, a width ($W_M$) that is approximately equal to a defect width (W) of the slot photonic crystal waveguide 100, a length ($L_M$) that is equal to or less than 1.5 μm, and interfaces with the slot photonic crystal waveguide 100 at an edge of a period that gives a termination parameter (τ) of approximately zero. The crystal holes and the center trench 102 are filled with a spin-on-glass (SOG) material in block 908. The silicon-on-insulator wafer is postbaked (e.g., 425° C. for 1 hour) to achieve partial decarbonization in block 910. The refractive index of SOG after hard baking is $n_{SOG}$=1.42 that is close to low-index electro-optical materials. At least the multimode interference coupler 600 and the slot photonic crystal waveguide 100 are then coated with an acrylic-based polymer layer that is optically transparent for a specified wavelength (e.g., 1550 nm) in block 912. Note that the step of patterning the hexagonal lattice photonic crystal slab layer in block 906 can further form an insulation gap 1200 (see FIG. 12) disposed between the multimode interference coupler 600 and the slot PCW 100, wherein the length of the multimode interference coupler 600 is reduced by approximately one half of a width of the insulation gap 1200. FIG. 8(b) is a picture of a cross-sectional view of the slot PCW 100 before (top) and after (bottom) filling SOG in accordance with the present invention. FIG. 10 confirms that all the void nanostructures in the waveguide slab layer have been filled with SOG. As the last step, an acrylic-based polymer layer that is transparent at 1.55 μm is coated to avoid symmetry-breaking background, where the guided modes can no longer be classified as even or odd and the band gap no longer exists [19].

FIG. 8(c) shows an enlarged portion of the dispersion diagram for the guided mode (top graph) and a transmission spectra of a 320 μm slot PCW 100 with (solid 802) and without (dashed 804) the MMI coupler 600 (bottom graph) in accordance with the present invention. The spectrum is normalized by the transmission through a reference waveguide. The parameters of the slot PCW 100 measured in FIG. 8(c) are α=383 nm, d=207 nm, $W_{slot}$=97 nm, $W_{strip}$=486 nm, $W_M$=1048 nm, $L_M$=1260 nm, and h=237 nm. To measure the insertion loss induced by mode mismatch, a symmetric 1×2 power splitter was integrated before the slot PCW 100 and introduced a reference arm composed of a strip waveguide to normalize the output of the slot PCW arm. Two samples are fabricated: one sample has MMI couplers 600 at the ends of the slot PCW 100, the other has the slot PCW 100 directly coupled to the stripe waveguides. The length of the slot PCW 100 in both cases is 320 μm. Compared with direct coupling, a 20 dB transmission enhancement over 35 nm optical bandwidth was found when the coupling structure 600 is employed. The insertion loss for the guided mode is less than 5 dB at the peak wavelength of 1557 nm. The measured band edge appears at a normalized frequency of 0.243 (λ=1576 nm). The observed spectral range agrees well with the calculated band diagram for the quasi-TE mode of the slot PCW 100. The slight frequency discrepancy can be attributed to the dimension and index differences between the simulated and fabricated waveguide structures.

Figure 11:
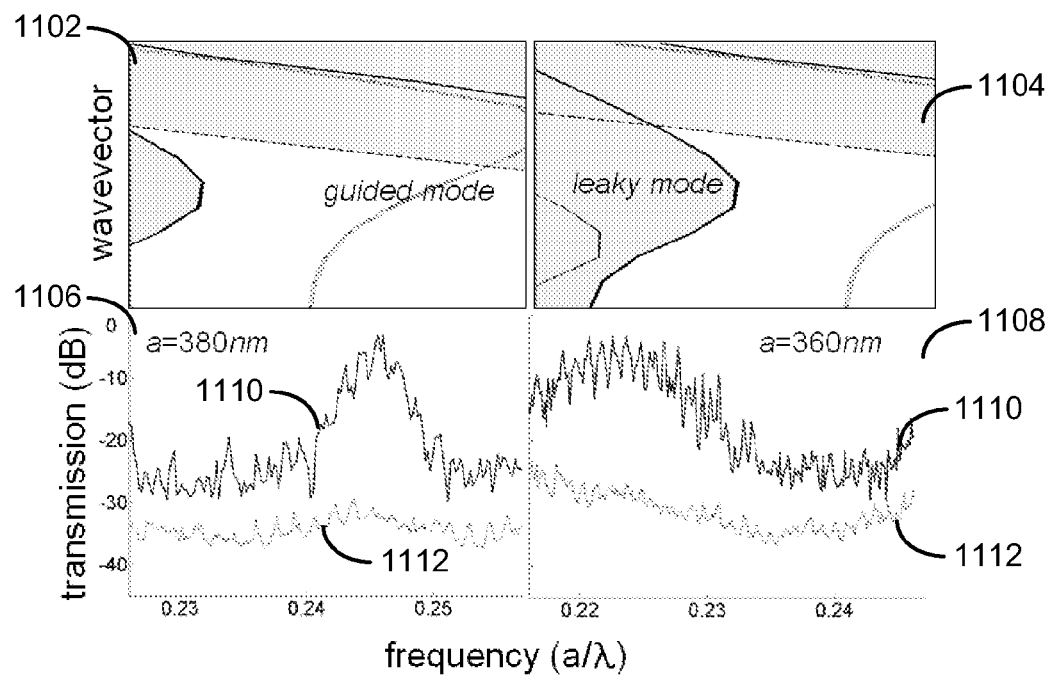
FIG. 11 are graphs showing the experimental results of the optical spectra for both guided mode and leaky modes in accordance with one embodiment of the present invention.

The experimental results of the optical spectra for both guided mode and leaky modes are shown in FIG. 11. The top panels 1102 and 1104 show enlarged portions of the photonic band structure for both guided and leaky modes. The bottom panels 1106 and 1108 show transmission spectrum of the slot PCW 100 of 320 μm length with (solid 1110) and without (dashed 1112) coupling structures 600. The spectrum is normalized on transmission through a reference optical circuit. Compared with direct coupling, one can find a 20 dB efficiency enhancement for the guided mode when the coupling structure is employed. The insertion loss for the guided mode is less than 5 dB. The measured band edge with slow light effect appears at the normalized frequency of 0.243. Comparing with the calculated band diagram for quasi-TE mode of the slotted photonic crystals, good agreement can be found between the simulated and experimental results. The frequency discrepancy is mainly due to the dimension difference between the simulated and fabricated waveguide structures. The mode mixing effect caused by the weak vertical asymmetry of the final device also induces some resonances in the spectrum [20].

Figure 12:
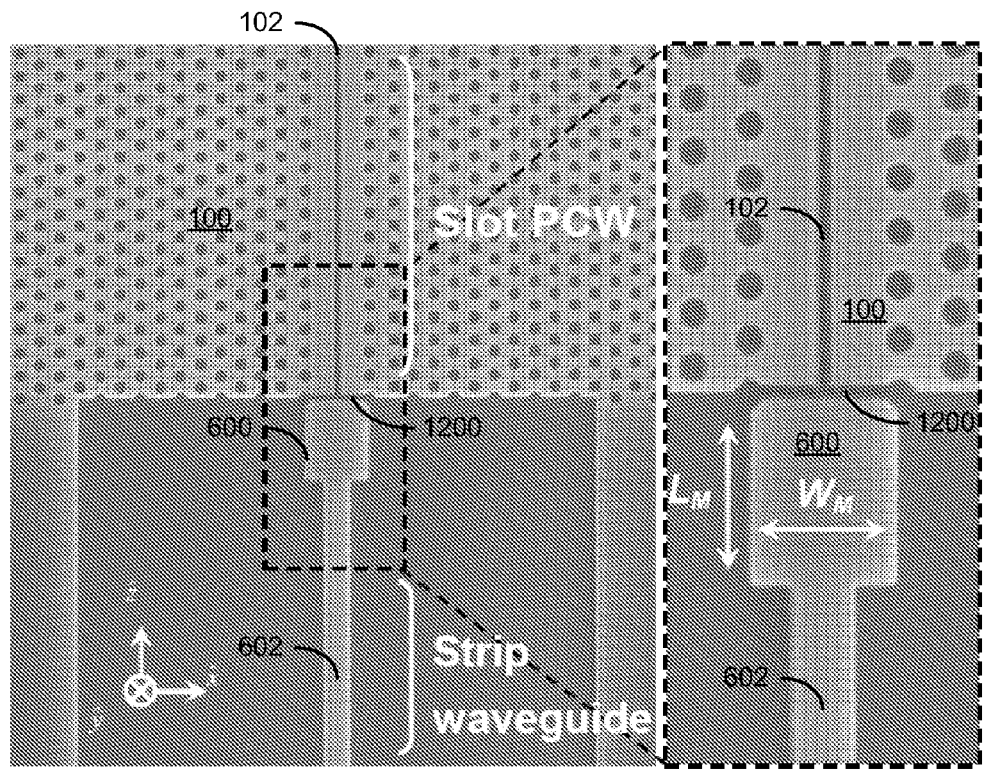
FIG. 12 is a diagram of a MMI coupler between a slot PCW and a strip waveguide in accordance with another embodiment of the present invention.

Now referring to FIG. 12, a MMI coupler 600 between a slot PCW 100 and strip waveguide 602 in accordance with another embodiment of the present invention is shown. The present invention achieves more efficient transmission control from structural innovation and optimization in order to meet the miniaturization demand of high performance micro-/nano-very-large-scale-integration (VLSI) photonic circuit. In this embodiment, an insulation gap or oxide slot 1200 is positioned perpendicular to the slot 102 of the slot PCW 100 at the interface between the slot PCW 100 and the MMI coupler 600. The insulation gap 1200 can have a width that is approximately equal to a width of a center 102 slot of the slot PCW 100. Note that the length of the MMI coupler 600 is reduced by approximately one half of a width of the insulation gap 1200. As before, the interference length $L_M$ and the waveguide width $W_M$ decide the optical mode profile at the interface as well as the coupling efficiency. As will be further described below, the structure shown in FIG. 12 provides an effective index change of as much as 30 times efficiency enhancement compared with the slotted silicon rib waveguide. Such a waveguide layer can serve as the active layer for fully embedded optical interconnect architecture with minimum power consumption.

Silicon has been considered as an attractive material option for low-cost photonic circuits. In contrast to those conventional optoelectronic components fabricated from III-V semiconductor compounds or electro-optic materials such as lithium niobate and nonlinear organic polymers, all-silicon based optical devices offer opportunities for monolithic integration with advanced electronic circuits on a single silicon substrate. In the past few years, high-speed silicon optical modulator [21-23] has been one of the significant advances in pushing device performance for applications ranging from telecommunication down to chip-to-chip interconnection. Nevertheless, it is challenging to achieve efficient optical intensity modulation in silicon because the material does not exhibit any appreciable electro-optic effect [24]. Therefore, a straightforward integration with high-frequency silicon modulator usually requires centimeter-scale active region and inevitable complex electrode design.

The light transmission controller presented here is based on a conventional Mach-Zehnder interferometer with a SOS capacitor embedded in each of the two arms. In order to obtain higher controlling performance, the slot PCW 100 has slow photon effect [22] wherein the width of the defect region (W) is ~1.2 μm, the center slot width ($W_{slot}$) is ~0.1 μm, the slab height (h) is ~0.24 μm and the lattice constant (a) of the hexagonal structure is ~0.4 μm. Both modeling and experimental data confirm the waveguide operates with a single transmission mode at the wavelength around 1.55 μm. Simulation indicates the guided mode is a quasi-transverse-electric mode with greatly reduced group velocity near the band edge.

The design focus of the MMI coupler 600 is to achieve practical output power level at the end of the active waveguide region. The input strip waveguide 602 is centered with respect to the MMI coupler 600 and therefore excites the symmetric modes with tunable phase difference. Parameter optimization indicates the best coupling efficiency is reached when the phase difference in the MMI coupler 600 is close to π. Further experimental comparison confirms such coupling structure enhances the coupling efficiency by 20 dB over 35 nm optical bandwidth centered on 1.55 µm. The oxide slot or insulation gap 1200 is introduced in the final device pattern to create strong parallel electric field for carrier accumulation.

Figure 13:
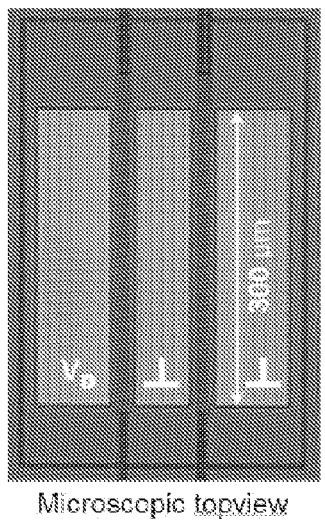
FIG. 13 is a microscopic top view of the symmetric Mach-Zehnder interferometer containing two SOS-capacitor-based phase shifters in accordance with another embodiment of the present invention.

A device, such as a symmetric Mach-Zehnder interferometer containing two SOS-capacitor-based phase shifters, with electrodes deposited at both sides of the waveguide region is shown by a microscopic top view in FIG. 13. To simplify the device fabrication flow and to limit the additional optical absorption from the sandwiched silicon layer, a bulk implantation is implemented on the silicon-on-insulator (SOI) wafer with $1\times10^{17}$ p-doping concentration. Aluminum can be used as the electrode material to achieve acceptable contact resistance. Measurement shows the final resistance after 900° C. thermal annealing is below 5 kΩ.

Figure 14:
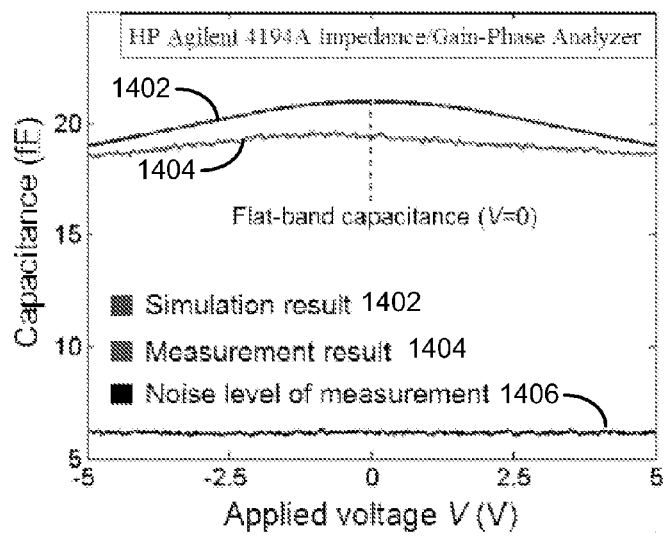
FIG. 14 is a graph showing the simulation and measurement results of device capacitance as a function of the applied voltage in accordance with another embodiment of the present invention.

FIG. 14 shows the simulation and measurement results of the device capacitance as a function of the applied voltage. The noise level of the capacitance measurement 1406 is ~6 femtofarad. The capacitance-voltage curve is simulated 1402 and compared with the measurement result 1404. The deviation of flat-band capacitance is due to positive oxide charges trapped in the center spin-on-glass trench. The curve slope difference is induced by various interface traps around the gate oxide. The negligible asymmetry stems from doping fluctuation and fabrication defects. Based on the measured electrical parameters, calculation shows the resistance-capacitance time constant of the active arm is below 120 ps. Doping profile modification would further reduce the time constant and make the slot waveguide-based silicon structure as a good candidate to realize high-speed transmission control.

Figure 15:
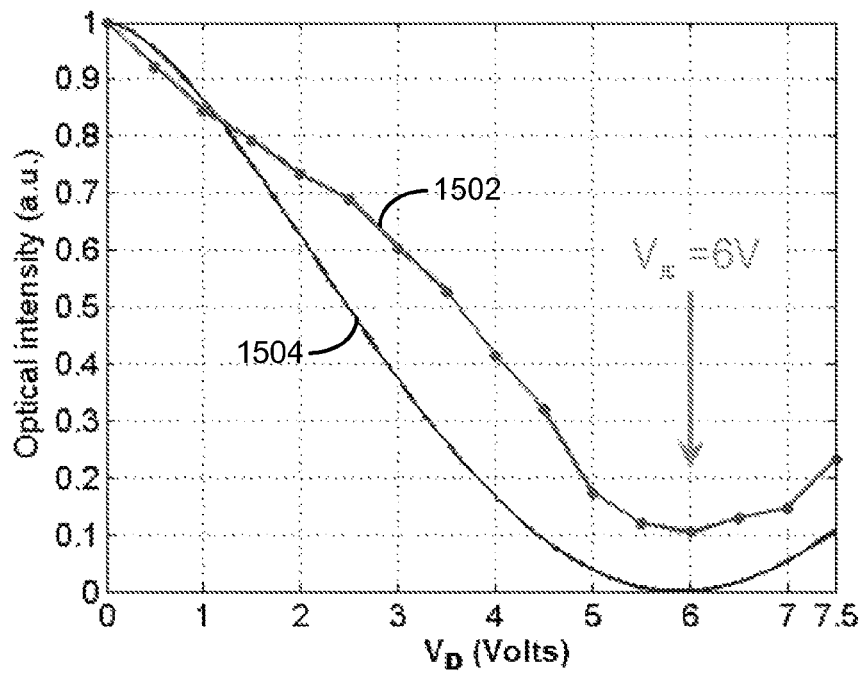
FIG. 15 is a graph of a DC modulation curve in accordance with another embodiment of the present invention.

Transmission control based on Mach-Zehnder interferometer requires dynamic phase shift between the two waveguide arms. The phase change in slot PCW 100 depends on the mode group velocity, the band shift and the total interaction length. Here carrier accumulation-induced plasma dispersion effect is applied to generate the expected band shift. FIG. 15 shows the measured modulation curve 1502 and the simulation result 1504. Both of them indicate ~6 V driving voltage is required to generate the it-phase shift between two interference arms. The evaluation of band shift distance is based on the plane-wave expansion (PWE) method.

Figure 16:
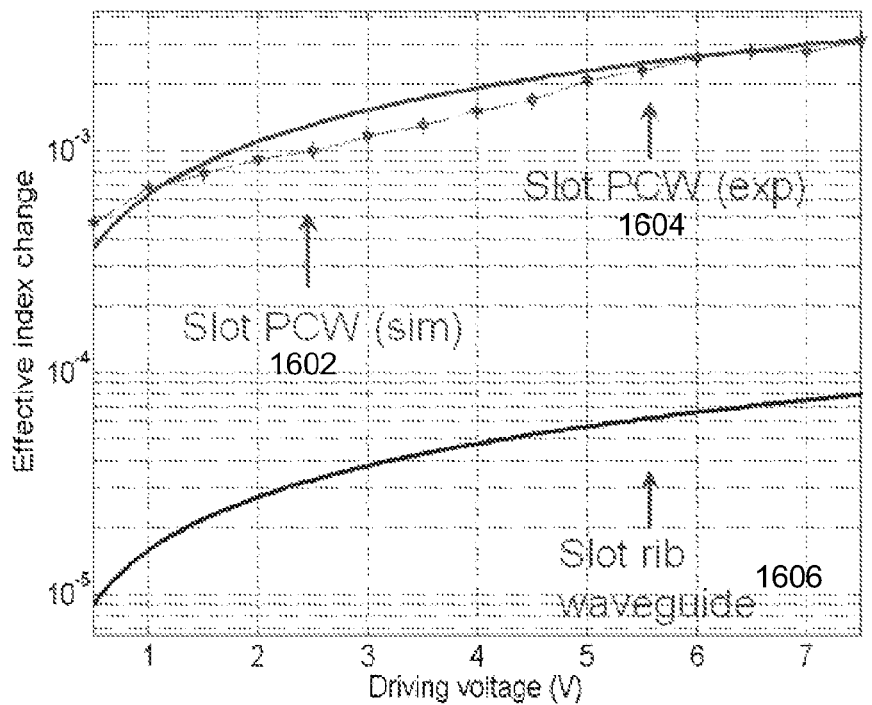
FIG. 16 is a graph of the effective index change induced by different driving voltage in accordance with another embodiment of the present invention.
Figure 17:
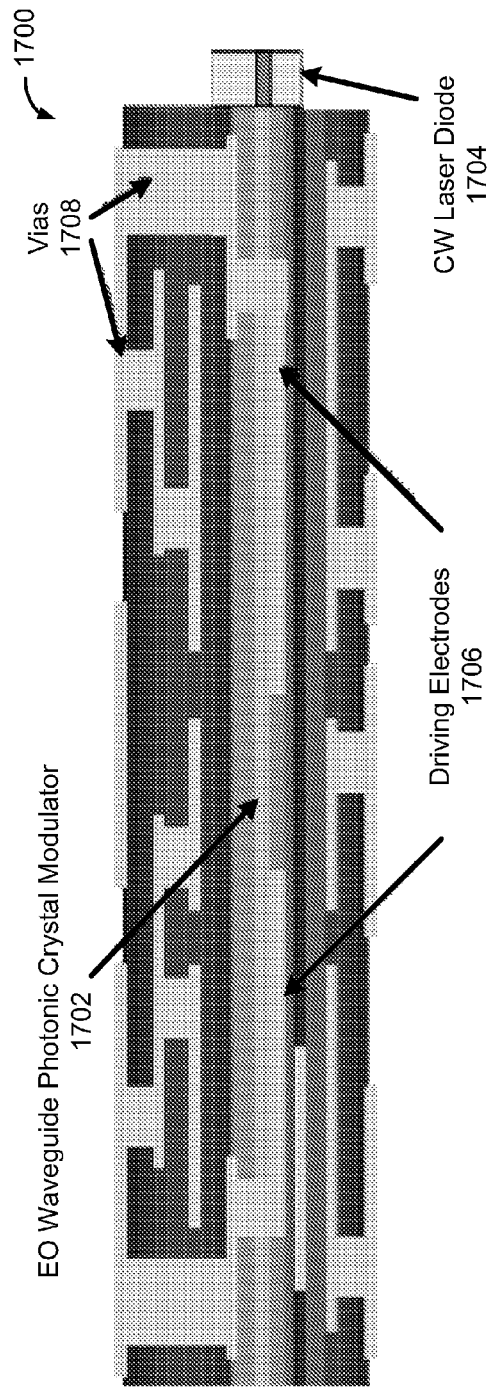
FIG. 17 is a cross-section of a fully embedded board level optical interconnect with an indirect modulation employing a photonic crystal waveguide modulator in accordance with another embodiment of the present invention.

In order to compare the efficiency of transmission control, the effective index change $\Delta n_{eff}$ of both slot PCW 100 (line 1602 (simulated) and line 1604 (measured)) and slot rib waveguide (line 1606) are calculated, as shown in FIG. 16. With different driving voltage applied, the slot PCW 100 always provides as much as 30 times $\Delta n_{eff}$ enhancement compared with the slot rib waveguide. The significant enhancement stems from the slow light effect of the photonic crystal waveguide. Power consumption and device size needed to modulate an optical signal are thus significantly reduced. This advantage is crucial for fully embedded board level interconnect 1700 [25-28] as indicated in FIG. 17 where heat dissipation due to the fully embedded structure is a paramount concern. The fully embedded board level optical interconnect 1700 with an indirect modulation employs a photonic crystal waveguide modulator 1702 where a CW laser 1704 is attached to provide constant light source. The spectrum is normalized by the transmission through a reference waveguide. The fully embedded board level optical interconnect 1700 also includes driving electrodes 1706 and vias 1708. As a result, the present invention provides a carrier accumulation-based efficient transmission controller operating at communication wavelength (1.55 µm). A MMI coupler 600 is incorporated to implement feasible waveguide combination. The final device is characterized based on electrical and optical performance. The measured device properties indicate that such structural innovation would be a practical option to achieve efficient transmission control based on an all-silicon optical component.

Figure 18A:
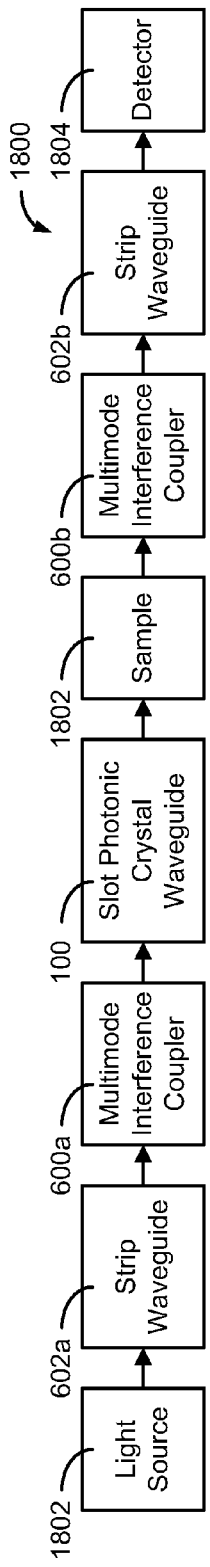
FIGS. 18A and 18B are block diagrams of sensors in accordance with the present invention.

Now referring to FIG. 18A, a block diagram of a sensor 1800 in accordance with the present invention is shown. The sensor 1800 can be a bio-sensor, chemical sensor, environmental sensor, structural sensor, etc. The sensor 1800 includes a light source 1802, such as a laser or light emitting device, optically coupled to a strip waveguide 602a. The strip waveguide 602a is optically coupled to a multimode interference coupler 600a which is optically coupled to the slot photonic crystal waveguide 100. The slot photonic crystal waveguide 100 is optically coupled to a photonic element containing one or more samples 1802 which is optically coupled to a multimode interference coupler 600b. The multimode interference coupler 600b is optically coupled to a strip waveguide 602b which is optically coupled to a detector 1804. The sensor 1800 may also include various optical switching devices, controllers, converters, bends, splitters, etc. Note that the samples may include one or more analytes, which is a molecule, chemical, compound, particle, cell fragment, cell, or biological entity for which the amount will be quantified. Examples of analytes include proteins, such as hormones or enzymes; glycoproteins; peptides; small molecules; polysaccharides; antibodies; nucleic acids; drugs, including drugs of abuse; toxins; inorganic particles such as colloidal gold particles; viruses or virus particles; bacteria; whole cells; portions of bacteria or cells; heavy metals; salts; isotopes; elements; nanoparticles; metal nanoparticles; semiconductor compositions (CdS or ZnS); dyes; electrolytes; waste; THC; polymers; aromatic compositions; amino acids; hormones; antibodies; receptors; antigens; and other compounds. The analytes can be used to detect what is in the one or more samples, the concentration of the one or more samples, etc.

Figure 18B:
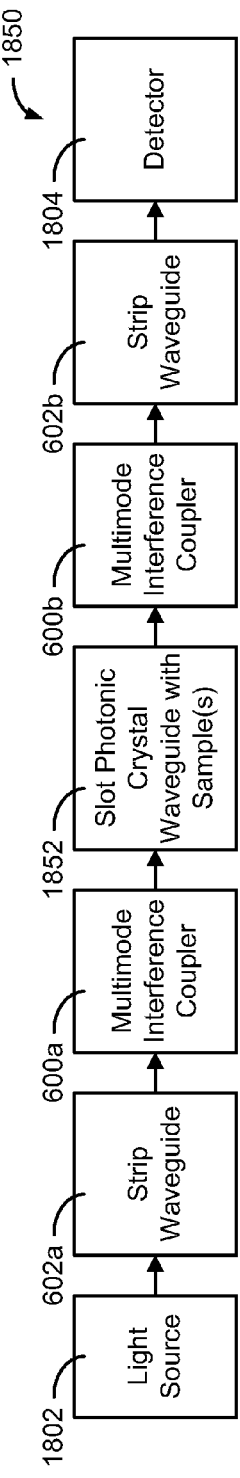

Referring now to FIG. 18B, a block diagram of a sensor 1850 in accordance with the present invention is shown. The sensor 1850 can be a bio-sensor, chemical sensor, structural sensor, etc. The sensor 1850 includes a light source 1802, such as a laser or light emitting device, optically coupled to a strip waveguide 602a. The strip waveguide 602a is optically coupled to a multimode interference coupler 600a which is optically coupled to the slot photonic crystal waveguide 1852. The slot photonic crystal waveguide 1852 is optically coupled to a multimode interference coupler 600b. The multimode interference coupler 600b is optically coupled to a strip waveguide 602b which is optically coupled to a detector 1804. At least a portion of the center slot 102 of the slot photonic crystal waveguide 1852 is configured to receive one or more samples. The sensor 1850 may also include various optical switching devices, controllers, converters, bends, splitters, etc. Note that the samples may include one or more analytes, which is a molecule, chemical, compound, particle, cell fragment, cell, or biological entity for which the amount will be quantified. Examples of analytes include proteins, such as hormones or enzymes; glycoproteins; peptides; small molecules; polysaccharides; antibodies; nucleic acids; drugs, including drugs of abuse; toxins; inorganic particles such as colloidal gold particles; viruses or virus particles; bacteria; whole cells; portions of bacteria or cells; heavy metals; salts; isotopes; elements; nanoparticles; metal nanoparticles; semiconductor compositions (CdS or ZnS); dyes; electrolytes; waste; THC; polymers; aromatic compositions; amino acids; hormones; antibodies; receptors; antigens; and other compounds. The analytes can be used to detect what is in the one or more samples, the concentration of the one or more samples, etc. Note that the combination of the insertion of the analytes into the slot region, enhanced sensitivity by slow light effect and concentration of photon energy in the slot region can increase sensitivity of the sensor by two to three orders of magnitude.

Figure 19:
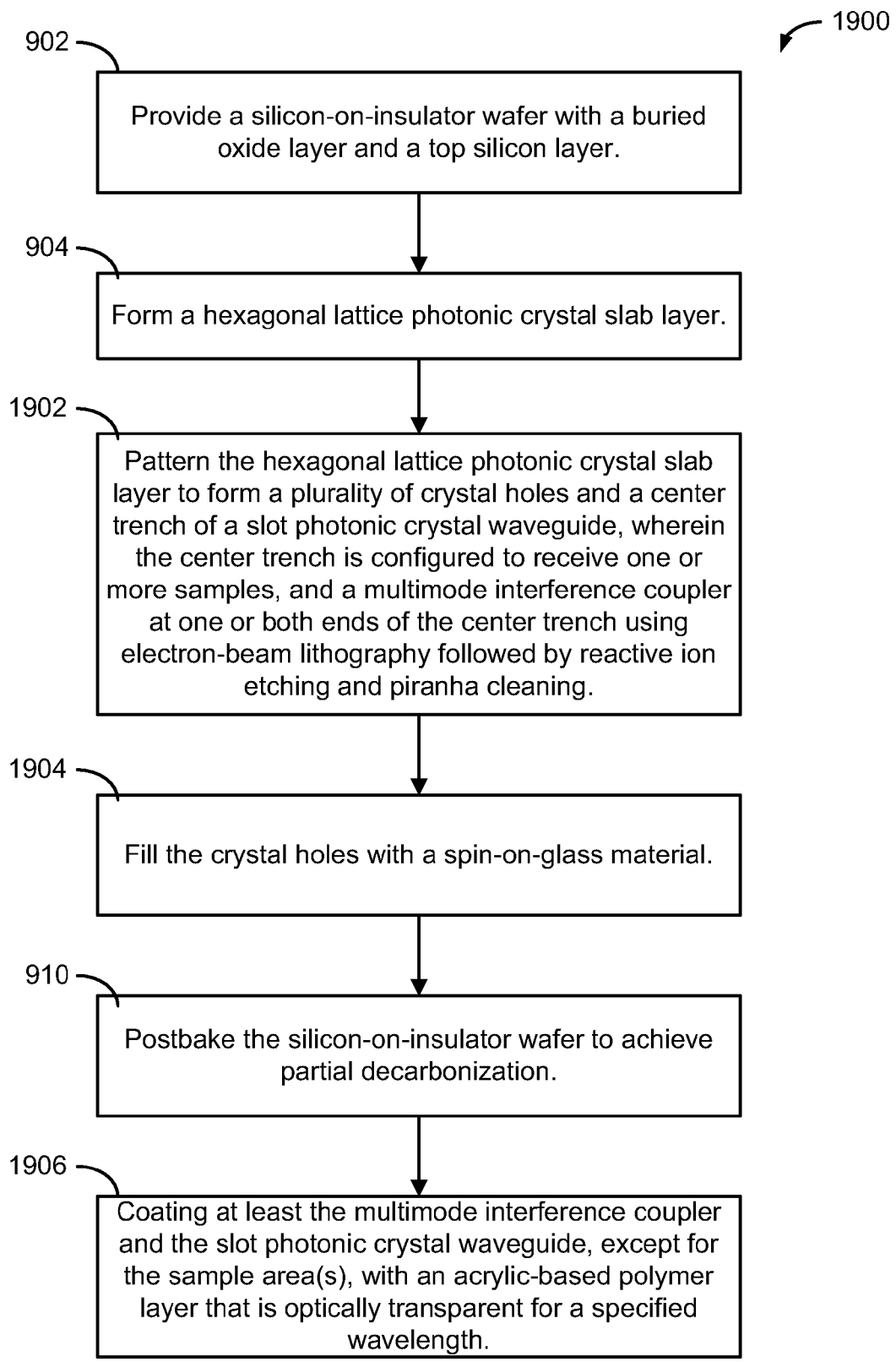
FIG. 19 is a flow chart of a manufacturing process to fabricate a slot PCW having one or more sample recesses within the center slot optically coupled to a MMI coupler that is used as part of a sensor in accordance with the present invention.

Now referring to FIG. 19, the manufacturing process 1900 for a slot PCW 100 having one or more sample recesses within the center slot optically coupled to a MMI coupler 600 that is used as part of a sensor in accordance with the present invention will now be described. A silicon-on-insulator (SOI) wafer with a buried oxide layer (e.g., 1-µm) and a top silicon layer (e.g., 250-nm) is provided in block 902. A hexagonal lattice photonic crystal slab layer 104 is formed in block 904. The hexagonal lattice photonic crystal slab layer 104 is then patterned to form a plurality of crystal holes and a center trench 102 of a slot photonic crystal waveguide 100 (e.g., lattice constant $\alpha$=360/380 nm and the hole diameter d=0.5$\alpha$), wherein at least a portion of the center trench 102 is configured to receive one or more samples, and a multimode interference coupler 600 at one or both ends of the center trench 102 using electron-beam lithography followed by reactive ion etching (RIE) and piranha cleaning in block 1902. Different lattice constants are employed to measure the optical transmission spectra for both guided mode and leaky modes of the waveguide 100. The multimode interference coupler 600 has a coupling efficiency to the slot photonic crystal waveguide 100 greater than or equal to 90%, a width ($W_M$) that is approximately equal to a defect width (W) of the slot photonic crystal waveguide 100, a length ($L_M$) that is equal to or less than 1.5 µm, and interfaces with the slot photonic crystal waveguide 100 at an edge of a period that gives a termination parameter ($\tau$) of approximately zero. The crystal holes are filled with a spin-on-glass (SOG) material in block 1904. Note that the portion of the center trench 102 that is not configured to receive the one or more samples can also be filled with the spin-on-glass (SOG) material in block 1904. The silicon-on-insulator wafer is postbaked (e.g., 425° C. for 1 hour) to achieve partial decarbonization in block 910. The refractive index of SOG after hard baking is $n_{SOG}$=1.42 that is close to low-index electro-optical materials. At least the multimode interference coupler 600 and the slot photonic crystal waveguide 100, except for the portion of the center trench 102 that is configured to receive the one or more samples, are then coated with an acrylic-based polymer layer that is optically transparent for a specified wavelength (e.g., 1550 nm) in block 1906. Note that the step of patterning the hexagonal lattice photonic crystal slab layer in block 906 can further form an insulation gap 1200 (see FIG. 12) disposed between the multimode interference coupler 600 and the slot PCW 100, wherein the length of the multimode interference coupler 600 is reduced by approximately one half of a width of the insulation gap 1200. Note that the samples may include one or more analytes, which is a molecule, chemical, compound, particle, cell fragment, cell, or biological entity for which the amount will be quantified. Examples of analytes include proteins, such as hormones or enzymes; glycoproteins; peptides; small molecules; polysaccharides; antibodies; nucleic acids; drugs, including drugs of abuse; toxins; inorganic particles such as colloidal gold particles; viruses or virus particles; bacteria; whole cells; portions of bacteria or cells; heavy metals; salts; isotopes; elements; nanoparticles; metal nanoparticles; semiconductor compositions (CdS or ZnS); dyes; electrolytes; waste; THC; polymers; aromatic compositions; amino acids; hormones; antibodies; receptors; antigens; and other compounds.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

REFERENCES

1. Y. Jiang, W. Jiang, L. Gu, X. Chen, and R. T. Chen, *Appl. Phys. Lett.* 87, 221105 (2005).

2. Y. A. Vlasov, M. O'Boyle, H. F. Hamann, and S. J. McNab, *Nature* (London) 438, 65 (2005).
3. L. Gu, Y. Jiang, W. Jiang, X. Chen, and R. T. Chen, *Proc. SPIE* 6128, 261 (2006).
4. L. Gu, W. Jiang, X. Chen, L. Wang, and R. T. Chen, *Appl. Phys. Lett.* 90, 071105 (2007).
5. M. Notomi, K. Yamada, A. Shinya, J. Takahashi, C. Takahashi, and I. Yokohama, *Phys. Rev. Lett.* 87, 253902 (2001).
6. M. Soljacic, S. G. Johson, S. Fan, M. Ibanescu, E. Ippen, and J. D. Joannopoulos, *J. Opt. Soc. Am.* B 19, 2052 (2002).
7. M. Roussey, M.-P. Bernal, N. Courjal, D. V. Labeke, F. I. Baida and R. Salut, *Appl. Phys. Lett.* 89, 241110 (2006).
8. V. R. Almeida, Q. Xu, C. A. Barrios, and M. Lipson, *Opt. Lett.* 29, 1209 (2004).
9. Q. Xu, V. R. Almeida, R. R. Panepucci, and M. Lipson, *Opt. Lett.* 29, 1626 (2004).
10. W. T. Lau and S. Fan, *Appl. Phys. Lett.* 81, 3915 (2002).
11. S. Fan, P. R. Villeneuve, J. D. Joannopoulos, and E. F. Schubert, *Phys. Rev. Lett.* 78, 3294 (1977).
12. E. Chow, S. Y. Lin, S. G. Johnson, P. R. Villeneuve, J. D. Joannopoulos, J.-R. Wendt, G. A. Vawter, W. Zubrzycki, H. Hou, and A. Alleman, *Nature* (London) 407, 983 (2000).
13. S. G. Johnson, P. R. Villeneuve, S. Fan, and J. D. Joannopoulos, *Phys. Rev. B* 62, 8212 (2000).
14. Y. Wang, Z. Lin, J. Zhang, X. Cheng and F. Zhang, *Appl. Phys. B* 79, 879 (2004)
15. Z. Y. Li, L. L. Lin, and K. M. Ho, *Appl. Phys. Lett.* 84, 4699 (2004).
16. M. Notomi, A. Shinya, K. Yamada, J. Takahashi, C. Takahashi, and I. Yokohama, *IEEE J. Quantum Electron* 38, 736 (2002).
17. L. B. Soldano and E. C. Pennings, *J. Lightwave Technol.* 13, 615 (1995).
18. Y. A. Vlasov and S. J. McNab, *Opt. Lett.* 31, 50 (2006).
19. S. G. Johnson, S. Fan, P. R. Villeneuve, J. D. Joannopoulos, and L. A. Kolodziejski, *Phys. Rev. B* 60, 5751 (1999).
20. Y. A. Vlasov, N. Moll, and S. J. McNab, *J. Appl. Phys.* 95, 4538 (2004).
21. A. Liu, R. Jones, L. Liao, D. Samara-Rubio, D. Rubin, O. Cohen, R. Nicolaescu, and M. Paniccia., "A high-speed silicon optical modulator based on a metal-oxide-semiconductor capacitor," *Nature* 427, 615 (2004).
22. Y. Jiang, W. Jiang, L. Gu, X. Chen, and R. T. Chen, "80-micron interaction length silicon nanophotonic crystal waveguide modulator," *Appl. Phys. Lett.* 87, 221105 (2005).
23. L. Liao, D. Samara-Rubio, M. Morse, A. Liu, D. Hodge, D. Rubin, U. D. Keil and T. Franck, "High speed silicon Mach-Zehnder modulator," *Optics Express* vol. 13, 3129 (2005).
24. R. A. Soref and B. R. Bennett, "Electrooptical effects in silicon," *IEEE J. Quantum Electron* QE-23, 123-129 (1987).
25. R. T. Chen, et al, "Fully Embedded Board level Guided-wave Optoelectronic Interconnects," *Proceedings of IEEE* Vol. 88, pp.780-793 (2000).
26. Choi, C., Lin, L., Yujie Liu, Jinho Choi, Li Wang, Haas, D., Magerat, J., Chen, R. T., "Flexible optical waveguide film fabrications and optoelectronic devices integration for fully embedded board-level optical interconnects," *Lightwave Technology, Journal of* Vol. 22, Issue 9, pp. 2168-2176 (September 2004).
27. Choi C, Lin L, Liu Y J, Ray T. Chen, "Performance analysis of 10-mu m-thick VCSEL array in fully embedded board level guided-wave optoelectronic interconnects," *J. Lightwave Tech.* 21 (6) 1531-1535 (June 2003).
28. J. H. Choi, L. Wang, H. Bi and R. T. Chen, "Effects of Thermal-Via Structures on Thin Film VCSELs for Fully Embedded Board-Level Optical Interconnection System," *IEEE Journal of Selected Topics on Quantum Electronics, Special Issue on Optoelectronic Packaging* pp. 1060-1065 (2006).
29. L. Gu, W. Jiang, X. Chen, and R. T. Chen, *IEEE Photonics Technol. Lett.* 19, 342 (2007).
30. B. Bortnik, Y.-C. Hung, H. Tazawa, B.-J. Seo, J. Luo, A. K.-Y. Jen, W. H. Steier, and H. R. Fetterman, *IEEE J. Sel. Top. Quantum Electron.* 13, 104 (2007).
31. N. N. Feng, R. Sun, L. C. Kimerling, et al., "Lossless strip-to-slot waveguide transformer," *Optics Lett.* 32 (10), pp 1250-1252 (May 15, 2007).

What is claimed is:

1. An optical apparatus comprising a multimode interference coupler configured to optically couple a strip waveguide to a slot photonic crystal waveguide wherein the multimode interference coupler has a coupling efficiency to the slot photonic crystal waveguide greater than or equal to 90%, a width that is approximately equal to a defect width of the slot photonic crystal waveguide, a length that is equal to or less than 1.5 μm, and interfaces with the slot photonic crystal waveguide at an edge of a period that gives a termination parameter of approximately zero.

2. The optical apparatus as recited in claim 1, wherein the length of the multimode interference coupler is equal to or less than 1.26 μm.

3. The optical apparatus as recited in claim 1, wherein the coupling efficiency is greater than or equal to 95%.

4. The optical apparatus as recited in claim 1, wherein:
the width of the multimode interference coupler is approximately equal to $1.6\sqrt{3}a$ where $a$ is a lattice constant of the slot photonic crystal waveguide; and
the length of the multimode interference coupler is approximately equal to $\pi/(\beta_0-\beta_2)$ where $\beta_0$ is a fundamental mode propagation constant in the multimode interference coupler and $\beta_2$ is a second order propagation constant in the multimode interference coupler.

5. The optical apparatus as recited in claim 1, further comprising an insulation gap disposed between the multimode interference coupler and the slot photonic crystal waveguide.

6. The optical apparatus as recited in claim 5, wherein the multimode interference coupler provides an efficiency enhancement of approximately thirty times that of a slotted silicon rib waveguide.

7. The optical apparatus as recited in claim 5, wherein a width of the insulation gap is approximately equal to a width of a center slot of the slot photonic crystal waveguide.

8. The optical apparatus as recited in claim 5, wherein the length of the multimode interference coupler is reduced by approximately one half of a width of the insulation gap.

9. The optical apparatus as recited in claim 1, wherein the optical apparatus is integrated into a sensor, a router, or a fully embedded board level interconnect.

10. The optical apparatus as recited in claim 1, wherein the optical apparatus is integrated into a sensor wherein:
one or more samples are deposited within at least a portion of a center slot of the slot photonic crystal waveguide; or
the samples are deposited within one or more recesses aligned with a center slot of the slot photonic crystal waveguide.

11. The optical apparatus as recited in claim 10, wherein the one or more samples comprise one or more analytes.

12. An optical apparatus comprising a multimode interference coupler configured to optically couple a strip waveguide to a slot photonic crystal waveguide wherein the multimode interference coupler has a coupling efficiency to the slot photonic crystal waveguide greater than or equal to 90%, a width that is approximately equal to $1.6\sqrt{3}\alpha$ where $\alpha$ is a lattice constant of the slot photonic crystal waveguide, a length that is approximately equal to $\pi/(\beta_0-\beta_2)$ where $\beta_0$ is a fundamental mode propagation constant in the multimode interference coupler and $\beta_2$ is a second order propagation constant in the multimode interference coupler, and interfaces with the slot photonic crystal waveguide at an edge of a period that gives a termination parameter of approximately zero.

13. The optical apparatus as recited in claim 12, further comprising an insulation gap disposed between the multimode interference coupler and the slot photonic crystal waveguide, wherein the length of the multimode interference coupler is reduced by approximately one half of a width of the insulation gap.

14. The optical apparatus as recited in claim 12, wherein the multimode interference coupler provides an efficiency enhancement of approximately thirty times that of a slotted silicon rib waveguide.

15. The optical apparatus as recited in claim 12, wherein a width of the insulation gap is approximately equal to a width of a center slot of the slot photonic crystal waveguide.

16. An optical apparatus comprising:
    a strip waveguide;
    a slot photonic crystal waveguide; and
    a multimode interference coupler disposed between the strip waveguide and the slot photonic crystal waveguide, wherein the multimode interference coupler has a coupling efficiency to the slot photonic crystal waveguide greater than or equal to 90%, a width that is approximately equal to a defect width of the slot photonic crystal waveguide, a length that is equal to or less than 1.5 μm, and interfaces with the slot photonic crystal waveguide at an edge of a period that gives a termination parameter of approximately zero.

17. The optical apparatus as recited in claim 16, further comprising an insulation gap disposed between the multimode interference coupler and the slot photonic crystal waveguide, wherein the length of the multimode interference coupler is reduced by approximately one half of a width of the insulation gap.

18. The optical apparatus as recited in claim 16, wherein the multimode interference coupler provides an efficiency enhancement of approximately thirty times that of a slotted silicon rib waveguide.

19. The optical apparatus as recited in claim 16, wherein the optical apparatus is integrated into a sensor wherein:
    one or more samples are deposited within at least a portion of a center slot of the slot photonic crystal waveguide; or
    the samples are deposited within one or more recesses aligned with a center slot of the slot photonic crystal waveguide.

20. The optical apparatus as recited in claim 19, wherein the one or more samples comprise one or more analytes.

21. A method for improving performance of an optical communication system comprising the steps of:
    designing a multimode interference coupler having a width that is approximately equal to $1.6\sqrt{3}\alpha$ where $\alpha$ is a lattice constant of a slot photonic crystal waveguide, a length that is approximately equal to $\pi/(\beta_0-\beta_2)$ where $\beta_0$ is a fundamental mode propagation constant in the multimode interference coupler and $\beta_2$ is a second order propagation constant in the multimode interference coupler; and
    fabricating the multimode interference coupler between a strip waveguide and the slot photonic crystal waveguide such that the multimode interference coupler interfaces with the slot photonic crystal waveguide at an edge of a period that gives a termination parameter of approximately zero.

22. The method as recited in claim 21, further comprising the step of fabricating an insulation gap disposed between the multimode interference coupler and the slot photonic crystal waveguide, wherein the length of the multimode interference coupler is reduced by approximately one half of a width of the insulation gap.

23. A method for manufacturing an optical apparatus comprising the steps of:
    providing a silicon-on-insulator wafer with a buried oxide layer and a top silicon layer;
    forming a hexagonal lattice photonic crystal slab layer;
    patterning the hexagonal lattice photonic crystal slab layer to form a plurality of crystal holes and a center trench of a slot photonic crystal waveguide, and a multimode interference coupler at one or both ends of the center trench using electron-beam lithography followed by reactive ion etching and piranha cleaning, wherein the multimode interference coupler has a coupling efficiency to the slot photonic crystal waveguide greater than or equal to 90%, a width that is approximately equal to a defect width of the slot photonic crystal waveguide, a length that is equal to or less than 1.5 μm, and interfaces with the slot photonic crystal waveguide at an edge of a period that gives a termination parameter of approximately zero;
    filling the crystal holes and the center trench with a spin-on-glass material;
    postbaking the silicon-on-insulator wafer to achieve partial decarbonization; and
    coating at least the multimode interference coupler and the slot photonic crystal waveguide with an acrylic-based polymer layer that is optically transparent for a specified wavelength.

24. The method as recited in claim 23, wherein the step of patterning the hexagonal lattice photonic crystal slab layer further forms an insulation gap disposed between the multimode interference coupler and the slot photonic crystal waveguide, wherein the length of the multimode interference coupler is reduced by approximately one half of a width of the insulation gap.

25. A method for manufacturing an optical apparatus comprising the steps of:
    providing a silicon-on-insulator wafer with a buried oxide layer and a top silicon layer;
    forming a hexagonal lattice photonic crystal slab layer;
    patterning the hexagonal lattice photonic crystal slab layer to form a plurality of crystal holes and a center trench of a slot photonic crystal waveguide, and a multimode interference coupler at one or both ends of the center trench using electron-beam lithography followed by reactive ion etching and piranha cleaning, wherein the multimode interference coupler has a coupling efficiency to the slot photonic crystal waveguide greater than or equal to 90%, a width that is approximately equal to a defect width of the slot photonic crystal waveguide, a length that is equal to or less than 1.5 μm, and interfaces with the slot photonic crystal waveguide at an edge of a period that gives a termination parameter of approximately zero, and wherein at least a portion of the center trench is configured to receive one or more samples;
    filling the crystal holes with a spin-on-glass material;

postbaking the silicon-on-insulator wafer to achieve partial decarbonization; and coating at least the multimode interference coupler and the slot photonic crystal waveguide, except for the portion of the center trench that is configured to receive the one or more samples, with an acrylic-based polymer layer that is optically transparent for a specified wavelength.

26. The method as recited in claim 25, wherein the step of patterning the hexagonal lattice photonic crystal slab layer further forms an insulation gap disposed between the multimode interference coupler and the slot photonic crystal waveguide, wherein the length of the multimode interference coupler is reduced by approximately one half of a width of the insulation gap.

* * * * *